(12) United States Patent
Karanen et al.

(10) Patent No.: US 10,933,964 B2
(45) Date of Patent: Mar. 2, 2021

(54) WATER LEAD-THROUGH MODULE AND METHOD OF ARRANGING A WATER LEAD-THROUGH TO A HULL OF A MARINE VESSEL

(71) Applicant: WÄRTSILÄ FINLAND OY, Vaasa (FI)

(72) Inventors: Peter Karanen, Helsinki (FI); Esa Häkkinen, Helsinki (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 16/297,023

(22) Filed: Mar. 8, 2019

(65) Prior Publication Data
US 2019/0308711 A1    Oct. 10, 2019

Related U.S. Application Data

(63) Continuation of application No. PCT/EP2018/058959, filed on Apr. 9, 2018.

(51) Int. Cl.
*F01N 3/04* (2006.01)
*B63H 21/32* (2006.01)

(52) U.S. Cl.
CPC ............. *B63H 21/32* (2013.01); *F01N 3/04* (2013.01); *F01N 2590/02* (2013.01)

(58) Field of Classification Search
CPC ....... B63H 21/32; F01N 3/04; F01N 2590/02; B63B 13/02; B63B 13/00
See application file for complete search history.

(56) References Cited

U.S. PATENT DOCUMENTS

| 3,394,671 A * | 7/1968 | Mayer ............ B63B 13/00 |
| | | 114/183 R |
| 6,038,992 A * | 3/2000 | Smith ............ B63B 13/00 |
| | | 114/183 R |

(Continued)

FOREIGN PATENT DOCUMENTS

| GB | 2469320 A | 10/2010 |
| WO | 2007045721 A1 | 4/2007 |
| WO | 2012113977 A1 | 8/2012 |

OTHER PUBLICATIONS

International Search Report (PCT/ISA/210) dated Sep. 14, 2018, by the European Patent Office as the International Searching Authority for International Application No. PCT/EP2018/058959.

(Continued)

*Primary Examiner* — Matthew T Largi
(74) *Attorney, Agent, or Firm* — Buchanan Ingersoll & Rooney PC

(57) ABSTRACT

A water lead-through module is disclosed for discharging water into the sea through a hull of a marine vessel provided with a flow tube having a first end and a second end. The flow tube is of first grade steel, having an attachment flange part at the first end of the flow tube, and an outlet flange part at the second end of the flow tube extending radially outwards. A planar transition plate of a second grade steel has an outer periphery and includes an opening defining an inner periphery which conforms with an outer periphery of the outlet flange part, and wherein the transition plate is arranged axially flush with, rigidly connected to, by welding, the outlet flange part of the flow tube.

10 Claims, 3 Drawing Sheets

(56) References Cited

U.S. PATENT DOCUMENTS

| | | | | |
|---|---|---|---|---|
| 6,164,231 | A * | 12/2000 | Shimmell | B63B 13/02 114/182 |
| 9,371,112 | B2 * | 6/2016 | Sarnowski | B63B 13/02 |
| 2008/0156731 | A1 * | 7/2008 | Gordon | B01F 5/0606 210/652 |
| 2010/0294186 | A1 * | 11/2010 | Tung | B63J 4/006 114/182 |
| 2013/0319236 | A1 | 12/2013 | Suominen | |

OTHER PUBLICATIONS

Written Opinion (PCT/ISA/237) dated Sep. 14, 2018, by the European Patent Office as the International Searching Authority for International Application No. PCT/EP2018/058959.

* cited by examiner

WATER LEAD-THROUGH MODULE AND METHOD OF ARRANGING A WATER LEAD-THROUGH TO A HULL OF A MARINE VESSEL

RELATED APPLICATION

This application claims priority as a continuation application under 35 U.S.C. § 120 to PCT/FI2018/058959 filed as an International Application on Apr. 9, 2018 designating the U.S., the entire content of which is hereby incorporated by reference in its entirety.

FIELD

The present disclosure relates to a water lead-through module. The disclosure also relates also to a method of arranging a water lead-through to a hull of a marine vessel.

BACKGROUND INFORMATION

Scrubber units for scrubbing exhaust gas from internal combustion piston engines, have been used on marine vessels to some extent. In such scrubber units the exhaust gas is led into the scrubber unit in which a scrubbing medium, such as an alkaline washing solution, is sprayed into the exhaust gas, whereby the alkaline components react with acidic components of the exhaust gas. The scrubbing medium is sometimes supplied from a so-called process tank. The scrubbing medium absorbs $SO_2$, heat and other components from the exhaust gas flow. Due, for example, to stricter environmental regulations, so-called two-stage or multi-stage scrubber units have been developed. In such scrubber units, a scrubbing medium is sprayed into the exhaust gas flow at two or several stages.

SUMMARY

A lead-through module is disclosed for discharging exhaust gas scrubbing water through a hull of a marine vessel, the module comprising: a flow tube having a first end and a second end, wherein the flow tube is of a first grade steel and includes: an attachment flange part at the first end of the flow tube; an outlet flange part at the second end of the flow tube extending radially outwards from the second end of the flow tube, the outlet flange part having an outer periphery; and a planar transition plate of a second grade steel, having an outer periphery with an opening defining an inner periphery of the transition plate, wherein the inner periphery of the transition plate conforms with an outer periphery of the outlet flange part, and wherein the transition plate is arranged axially flush with, and rigidly connected to the outlet flange part of the flow tube.

A method of arranging a water lead-through to a hull of a marine vessel is also disclosed, the method comprising: providing a flow tube of a first grade stainless steel having a first end and a second end, the flow tube having an attachment flange part at the first end of the flow tube and an outlet flange part at the second end of the flow tube extending radially outwards from the second end of the flow tube, the outlet flange part having an outer periphery; providing a planar transition plate of a second grade steel having an outer periphery and arranging an opening into the transition plate defining an inner periphery of the transition plate, such that the inner periphery of the transition plate conforms with an outer periphery of the outlet flange part, and arranging the transition plate axially flush with, and rigidly connecting the transition plate by welding to the outlet flange part of the flow tube; and providing an opening to the hull of the marine vessel conforming with the outer periphery of the transition plate and rigidly connecting the transition plate to the opening in the hull of the vessel.

BRIEF DESCRIPTION OF THE DRAWINGS

In the following, exemplary embodiments will be described with reference to the accompanying exemplary, schematic drawings, in which.

DETAILED DESCRIPTION

Figure 1:
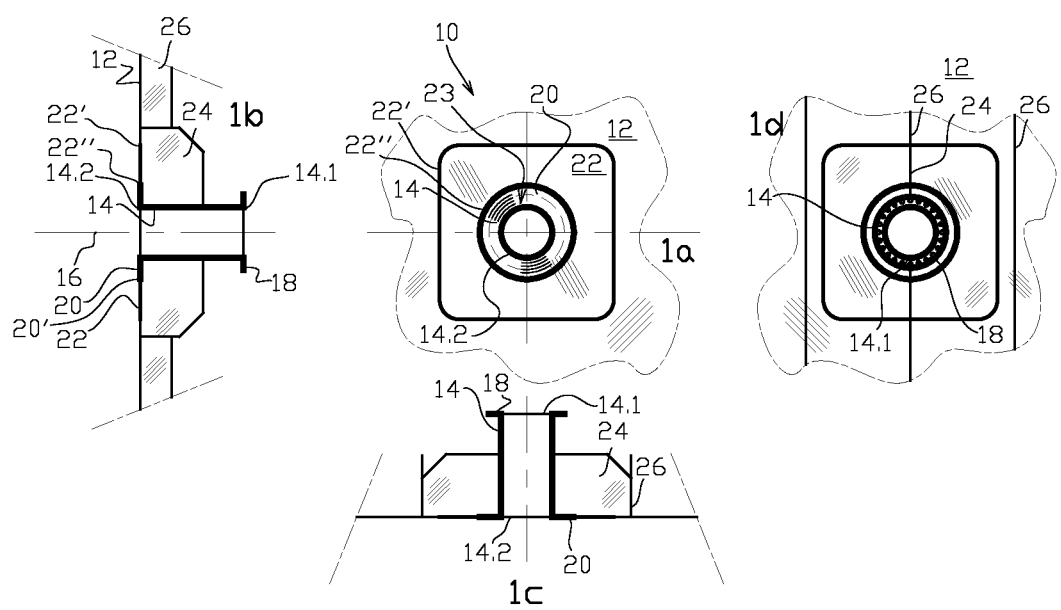
FIG. 1 illustrates a water lead-through module according to an exemplary embodiment of the disclosure.

As an example of such scrubber unit, a document WO 2007/045721 A1, the contents of which are hereby incorporated by reference in their entirety, is referenced. WO 2007/045721 A1 discloses a method and an arrangement for treating the exhaust gases of a large supercharged internal combustion engine, such as a diesel engine, in a system, in which the exhaust gases from the engine are conducted to an exhaust gas scrubber to be washed and cooled at least mainly by water. The exhaust gases are cooled in the exhaust gas scrubber in order to condensate the water vapor in the exhaust gases and recover clean water and the thus recovered water is supplied to the inlet air of the engine. In the exhaust gas scrubber the cooling of the exhaust gases is accomplished in at least two stages, a washing stage and a cooling stage, which are arranged successively. WO 2007/045721 A1 suggests that in case the engine with its systems is placed on a watercraft or other structure placed in water, seawater may advantageously be used as a cooling liquid of the heat exchanger and similarly, as the wash water.

WO2012113977 A1, the contents of which are hereby incorporated by reference in their entirety, discloses a scrubber system for treating exhaust gas in a marine vessel with a water based solution includes a first scrubber unit and a second scrubber unit, an exhaust gas inlet in the first scrubber unit and an exhaust gas outlet in the second scrubber unit and a second conduit section connecting the first scrubber unit to the second scrubber unit, a first scrubbing medium circuit and a second scrub-scrubbing medium circuit. The first scrubber medium circuit is provided with a source of scrubbing solution having a first connection to an outside of a hull of the vessel beneath the water line of the vessel and the second scrubber medium circuit is provided with a source of scrubbing solution having a source of fresh water in the vessel.

In a marine installation the scrubbing medium can be fresh water or sea water i.e. the water in which the vessel is floating. In case fresh water is used, it can be re-circulated, so that the same water can be re-used, and a small portion of the re-circulated fresh water, called bleed-off, is diverted from the main stream, conducted to a treatment plant for cleaning, and discharged overboard. Used water is compensated by a certain amount of new topping-up fresh water. In case of sea water, all used water can be conducted to a treatment plant, and discharged overboard, for example without any re-circulation taking place.

The amount of sea water flow required for obtaining adequate scrubbing effect in a marine vessel is considerable and the water may be corrosive to some extent and therefore the discharge of the water from the vessel through its hull can be problematic.

Exemplary embodiments disclosed herein provide a water lead-through module for discharging exhaust gas scrubbing water into the sea through a hull of a marine vessel in which the corrosive resistance and safe operation is considerably improved compared to known solutions.

According to an exemplary embodiment, a water lead-through module for discharging water into the sea through a hull of a marine vessel includes a flow tube having a first end and a second end, wherein the flow tube is of a first grade steel and includes: an attachment flange part at the first end of the flow tube for attaching a valve thereto; an outlet flange part at the second end of the flow tube extending radially outwards from the second end of the flow tube having an outer periphery; and a planar transition plate of a second grade steel having an outer periphery and having an opening defining an inner periphery of the transition plate in the plane, wherein the inner periphery of the transition plate conforms with an outer periphery of the outlet flange part, and wherein the transition plate is arranged axially flush with, and rigidly connected to, by welding, the outlet flange part of the flow tube.

According to an exemplary embodiment the first grade steel and the second grade steel are selected to that corrosion resistance of the first grade steel is higher than corrosion resistance of the second grade steel.

According to an exemplary embodiment the first grade steel is of high-alloy austenitic stainless steel as defined in EN 1.4547.

According to an exemplary embodiment the second grade steel is Grade A steel according to DNV (Det Norske Veritas) off-shore standards.

According to an exemplary embodiment the first grade steel is super duplex.

According to an exemplary embodiment the first grade steel is high-alloy austenitic stainless steel as defined in EN 1.4547 and the second grade steel is Grade A steel according to DNV (Det Norske Veritas) off-shore standards.

According to an exemplary embodiment the first grade steel is high-alloy austenitic stainless steel as defined in EN 1.4547 and the second grade steel is a duplex steel.

According to an exemplary embodiment a sealed housing is arranged around the flow tube extending from the wall of the flow tube to the transition plate.

According to an exemplary embodiment the flow tube includes an intermediate flange part between the attachment flange part and the outlet flange part, wherein an annular housing is arranged around the flow tube extending between the intermediate flange part and the transition plate.

According to an exemplary embodiment the sealed housing is provided with a leak detector.

According to an exemplary embodiment the outlet flange part extends radially outwards the flow tube of a distance D which is at least 50% (e.g., ±10%) of the diameter Dt of the flow tube.

According to an exemplary embodiment the transition plate is made of two separate steel parts rigidly joined to each other. The two separate parts of the transition plate are made of different material both being of second grade steel. A radially inner part is welded to the outer periphery of the outlet flange part and, and the second, outer part is welded to the outer periphery of the inner part of the transition plate.

The inner part can be of duplex steel, and the second part can be of Grade A steel according to Det Norske Veritas offshore standards.

An exemplary method is also disclosed of arranging a water lead-through to a hull of a marine vessel, the method including: providing a flow tube of a first grade steel having a first end and a second end, wherein the flow tube is provided with an attachment flange part at the first end of the flow tube and an outlet flange part at the second end of the flow tube extending radially outwards from the second end of the flow tube having an outer periphery, providing a planar transition plate of a second grade steel having an outer periphery and arranging an opening into the transition plate defining an inner periphery of the transition plate, such that the inner periphery of the transition plate conforms with an outer periphery of the outlet flange part; arranging the transition plate axially flush with, and rigidly connecting the transition plate by welding, to the outlet flange part of the flow tube; and providing an opening to the hull of the marine vessel conforming with the outer periphery of the transition plate and rigidly connecting the transition plate by welding, to the opening in the hull of the vessel.

The exemplary embodiments presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

FIG. 1 depicts schematically a lead-through module 10 for discharging exhaust gas scrubbing water into the sea, through a hull 12 of a marine vessel. The water lead-through module 10 is shown in the FIG. 1 by way of four different views; view 1a is a front view seen outside the hull 12, view 1b is side view, view 1d is a view behind, inside the hull and the view 1c is a top view. The lead-through module 10 is specifically intended to serve as a submerged outlet for a scrubber water discharged from an exhaust gas scrubber installed in the vessel. In the following description the water lead-through module 10 is referred to as a module 10 for sake of simplicity.

The module 10 includes a flow tube 14 having a first 14.1 end and a second end 14.2 and a longitudinal central axis 16. In order to cope with the corrosive discharge water of the exhaust gas scrubber of the vessel the flow tube is of corrosion resistant steel.

The flow tube 14 includes an attachment flange part 18 at the first end 14.1 of the flow tube 14 for attaching a valve and a discharge channel from the scrubber to the flow tube, and an outlet flange part 20 at the second end 14.2 of the flow tube 14. The outlet flange part 20 is configured to extend radially outwards from the second end 14.2 of the flow tube 14. The outlet flange has an outer periphery, which is advantageously circular. The exemplary steel used in the tube 14 and the flange parts 18, 20 is referred to herein as a first grade steel.

Exemplary preferred first grade steel includes high alloy austenitic steel and duplex (or austenitic-ferritic) steel. An example of high-alloy austenitic stainless steel may be a steel defined in EN 1.4547 having chemical composition in weight percentage C 0.01/N 0.20/Cr 20/Ni 18/Mo 6.1/Others Cu. An example of duplex steel may be a steel defined in EN 1.4162 having chemical composition in weight percentage C 0.03/N 0.22/Cr 21.5/Ni 1.5/Mo 0.3/Others 5Mn Cu.

As an indication of corrosion resistance a Pitting Resistant Equivalent number PREN can be used. The PREN-value can, for example, be calculated using the following formula: PREN=1×% Cr+3.3×% Mo+16×% N, with an exception that stainless steels with molybdenum content≥1.5% the PREN-value takes into account tungsten [W] in the alloy and is defined with the formula: PREN=1·% Cr+3.3 (% Mo+0.5·% W)+16·% N. The higher the PRE-value, the more corrosion resistant the steel is. Advantageously the pitting resistance equivalent number of the first grade steel is, for example, equal or at least 40 and the pitting resistance equivalent number of the second grade steel is less than 40.

Further, the module 10 includes a planar transition plate 22 having an outer periphery 22' and including an opening 23 defining an inner periphery 22" of the transition plate. The inner periphery 22" of the transition plate conforms to an outer periphery 20' of the outlet flange part 20 such that the peripheries are butting with each other. The transition plate 22 can be arranged axially flush with the outlet flange part 20 and rigidly connected to, by, for example, welding, the outlet flange part 20 of the flow tube 14. The transition plate 22 is of normal steel equivalent to the steel used in the vessel's hull 12.

The module 10 can be prefabricated at a manufacturing plant to include the flow tube 14, the attachment flange part 18 and the outlet flange part 20 as well as the transition plate 22 welded to the outlet flange part 20. When the module is assembled into hull 12 of the vessel a hole corresponding to the periphery dimensions of the module 10 is made to the hull 12 and the module is, for example, welded to the hull at its periphery, which is the outer periphery 22' of the transition plate 22. The flow tube 14 is supported by a number of suitably arranged support brackets 24, optionally making use of stiffeners 26 attached to the hull 12.

Figure 2:
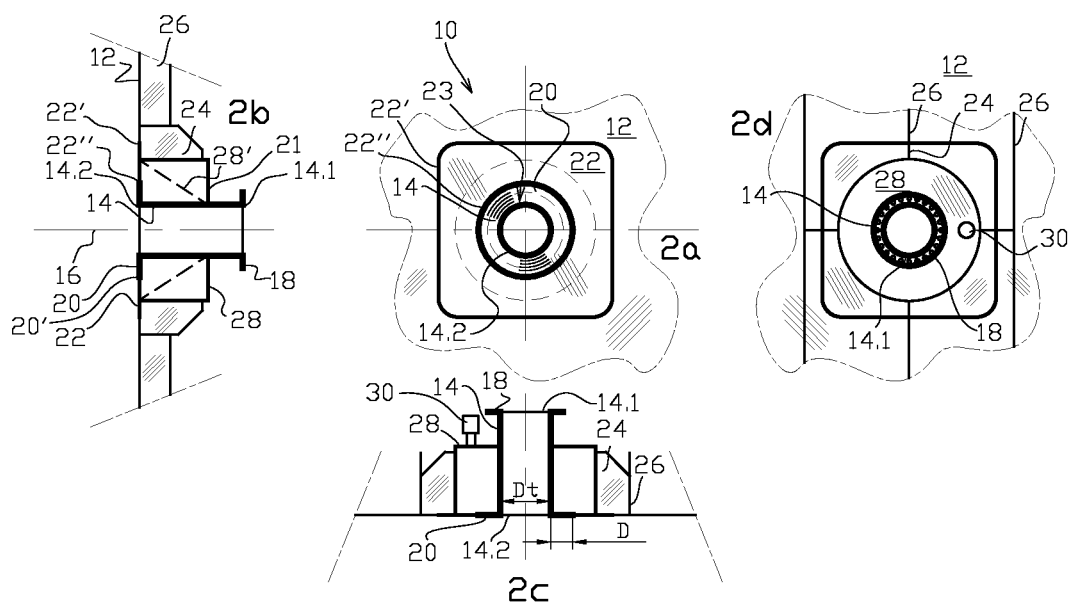
FIG. 2 illustrates a water lead-through module according to another exemplary embodiment of the present disclosure.

FIG. 2 depicts schematically a water lead-through module 10 according to another exemplary embodiment, which includes in addition to the features of the embodiment of the FIG. 1, some additional features. The water lead-through module 10 is shown in the figure as four different views; view 2a is a front view outside the hull 12, view 2b is side view, view 2d is a view behind, inside the hull and the view 2c is a top view. As is the embodiment in the FIG. 1, the lead-through module is specifically intended to serve as a submerged outlet for a scrubber water discharged from an exhaust gas scrubber installed in the vessel. In the following description the water lead-through module 10 is referred to as a module for sake of simplicity.

The module 10 includes a flow tube 14 having a first 14.1 end and a second end 14.2 and an attachment flange part 18 at the first end 14.1 of the flow tube 14 for attaching a valve and a discharge channel from the scrubber to the flow tube, and an outlet flange part 20 at the second end 14.2 of the flow tube 14. The outlet flange part 20 is configured to extend radially outwards from the second end 14.2 of the flow tube 14. The outlet flange has an outer periphery, which is advantageously circular.

Further, the module 10 includes a planar transition plate 22 having an outer periphery 22' and including an opening 23 defining an inner periphery 22" of the transition plate. The inner periphery 22" of the transition plate conforms to an outer periphery 20' of the outlet flange part 20 such that the peripherys are butting with each other. The transition plate 22 is arranged axially flush with the outlet flange part 20 and rigidly connected to, by welding, the outlet flange part 20 of the flow tube 14.

The module includes a sealed housing 28 arranged annularly around the flow tube 14. The housing extends from an outer wall of the flow tube 14 between its ends, to the transition plate 22. This way the weld joint between the outlet flange part 20 and the transition plate 22 is enclosed by the housing 28. The housing can be of different form as is depicted by the conical dashed line referred by number 28', but in the FIG. 2 the flow tube includes an intermediate flange part 21 between the attachment flange part 18 and the outlet flange part 20, wherein an annular housing 28 is arranged around the flow tube 14 extending between the intermediate flange part 21 and the transition plate 22.

As is depicted in the views 2c and 2d the sealed housing is provided with a leak detector 30. The leak detector can be realized in practise, for example, as a float level measuring device, an alarm float or a pressure sensor. In case the weld joint between the outlet flange part 20 and the transition plate 22 should fail and leak, the leak can be detected by increased pressure in the housing due to water entering the housing 28. Float sensors in turn indicates a raise of water surface in the housing.

Referring to the view 2C of the FIG. 2 the outlet flange part 20 extends radially outwards from the flow tube of a distance D which is at least 50% (e.g., ±10%) of the diameter Dt of the flow tube.

The module 10 can be prefabricated at a manufacturing plant to include the flow tube 14, the attachment flange part 18 and the outlet flange part 20 as well as the transition plate 22 and the housing 28.

The water lead-through module 10 according to an exemplary embodiment can be manufactured by providing a flow tube 14 of high-alloy austenitic stainless steel having a first end and a second end and a longitudinal central axis, wherein the flow tube is provided with an attachment flange part 18 at the first end of the flow tube for attaching a valve thereto and an outlet flange part 20 at the second end of the flow tube extending radially outwards from the second end of the flow tube having an outer periphery 20', providing a planar transition plate 22 having an outer periphery 22' and arranging an opening 23 into the transition plate 22 defining an inner periphery 22" of the transition plate, such that the inner periphery 22" of the transition plate conforms with an outer periphery 20' of the outlet flange part 20, and arranging the transition plate axially flush with, and rigidly connecting the transition plate 22 by welding, to the outlet flange part 20 of the flow tube 14, providing an opening to the hull 12 of the marine vessel conforming with the outer periphery 22' of the transition plate 22 and rigidly connecting the transition plate by welding, to the opening in the hull of the vessel.

When the module is assembled into hull 12 of the vessel at a dockyard, a hole corresponding to the periphery dimensions of the module 10 is made to the hull 12 and the module is welded to the hull at its periphery periphery, which is the outer periphery 22' of the transition plate 22. The flow tube 14 is supported by a number of suitably arranged support brackets 24, optionally making use of stiffeners 26 attached to the hull 12.

Figure 3:
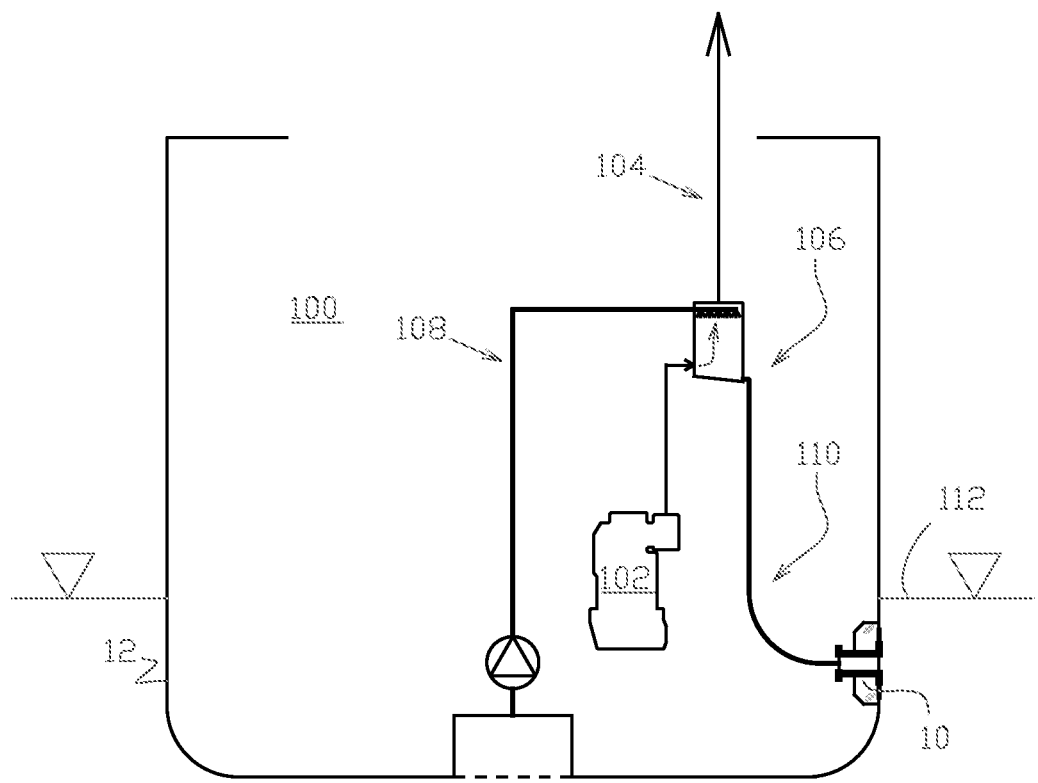
FIG. 3 illustrates an exhaust gas scrubber in a marine vessel provided with a water lead-through module according to an exemplary embodiment of the disclosure.

FIG. 3 shows schematically a marine vessel 100 with a hull 12. The vessel includes at least one internal combustion engine 102 provided with an exhaust gas channel 104 extending from the engine to outside the vessel 100 The vessel further includes an exhaust gas scrubber 160 configured to clean the exhaust gas. The exhaust gas scrubber includes sea water introduction system 108 configured to spray sea water into the exhaust gas stream. The exhaust gas scrubber includes scrubber water discharge system 110 extending from the scrubber 106 to the lead-through 10 as described in one of the FIG. 1 or 2 in the hull 12. The lead-through 10 is below the water surface 112 when the vessel is at sea.

It should be noted that in the figures the hull 12, the transition plate 22 and the tube 14 and its flange parts are illustrated by different line thicknesses for illustrative purpose only.

While the invention has been described herein by way of examples in connection with what are, at present, considered to be exemplary preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A lead-through module for discharging exhaust gas scrubbing water through a hull of a marine vessel, the module comprising:
   a flow tube having a first end and a second end, wherein the flow tube is of a first grade steel and includes:
      an attachment flange part at the first end of the flow tube; and
      an outlet flange part at the second end of the flow tube extending radially out-wards from the second end of the flow tube, the outlet flange part having an outlet flange outer periphery; and
   a planar transition plate of a second grade steel, having a planar transition plate outer periphery and an opening defining a planar transition plate inner periphery, wherein the planar transition plate inner periphery conforms with the outlet flange outer periphery, and wherein the transition plate is arranged axially flush with, and rigidly connected to, the outlet flange part.

2. The lead-through module according to claim 1, wherein the first grade steel and the second grade steel are selected so that corrosion resistance of the first grade steel is higher than corrosion resistance of the second grade steel.

3. The lead-through module according to claim 1, wherein the flow tube is of high-alloy austenitic stainless steel as is defined in EN 1.4547.

4. The lead-through module according to claim 3, wherein the flow tube comprises:
   an intermediate flange part between the attachment flange part and the outlet flange part; and
   an annular housing arranged around the flow tube extending between the intermediate flange part and the transition plate.

5. The lead-through module according to claim 1, wherein the transition plate is of Grade A steel according to Det Norske Veritas offshore standards.

6. The lead-through module according to claim 1, comprising:
   a sealed housing arranged around the flow tube extending from a wall of the flow tube to the transition plate.

7. The lead-through module according to claim 6, wherein the sealed housing includes:
   a leak detector.

8. The lead-through module according to claim 1, wherein the outlet flange part extends radially outwards from the flow tube a distance (D) which is at least 50% of a diameter of the flow tube.

9. A marine vessel, comprising:
   a hull configured to include the lead-through module according to claim 1.

10. A method of arranging a water lead-through to a hull of a marine vessel, the method comprising:
   providing a flow tube of a first grade stainless steel having a first end and a second end, the flow tube having an attachment flange part at the first end of the flow tube and an outlet flange part at the second end of the flow tube, the outlet flange part extending radially outwards from the second end of the flow tube having an outlet flange outer periphery;
   providing a planar transition plate of a second grade steel having a planar transition plate outer periphery and arranging an opening into the transition plate defining a planar transition plate inner periphery, such that the planar transition plate inner periphery conforms with the outlet flange outer periphery;
   arranging the transition plate axially flush with the outlet flange part, and rigidly connecting the transition plate thereto via a weld; and
   providing an opening to the hull of the marine vessel conforming with the outer periphery of the transition plate and rigidly connecting the transition plate to the opening in the hull of the vessel.

* * * * *